Nov. 17, 1931.  M. ALDEN  1,832,175

TUNING MECHANISM FOR RADIO RECEPTION, ETC

Filed Jan. 24, 1927

INVENTOR
Milton Alden

Patented Nov. 17, 1931

1,832,175

UNITED STATES PATENT OFFICE

MILTON ALDEN, OF SPRINGFIELD, MASSACHUSETTS, ASSIGNOR, BY MESNE ASSIGNMENTS, TO RADIO INVENTIONS, INC., A CORPORATION OF NEW YORK

TUNING MECHANISM FOR RADIO RECEPTION, ETC.

Original application filed December 14, 1926, Serial No. 154,689. Divided and this application filed January 24, 1927. Serial No. 163,196.

This invention relates particularly to a drum actuator for condensers and is a division from #154,689 filed December 14th, 1926.

One object is to provide a drum suitable for actuating a variable condenser.

Another object is to provide an indicating type drum provided with an insertable strip or scale.

Another object is to provide a drum having a scale or indicating strip which is adjustable circumferentially of the drum.

Figure 1:
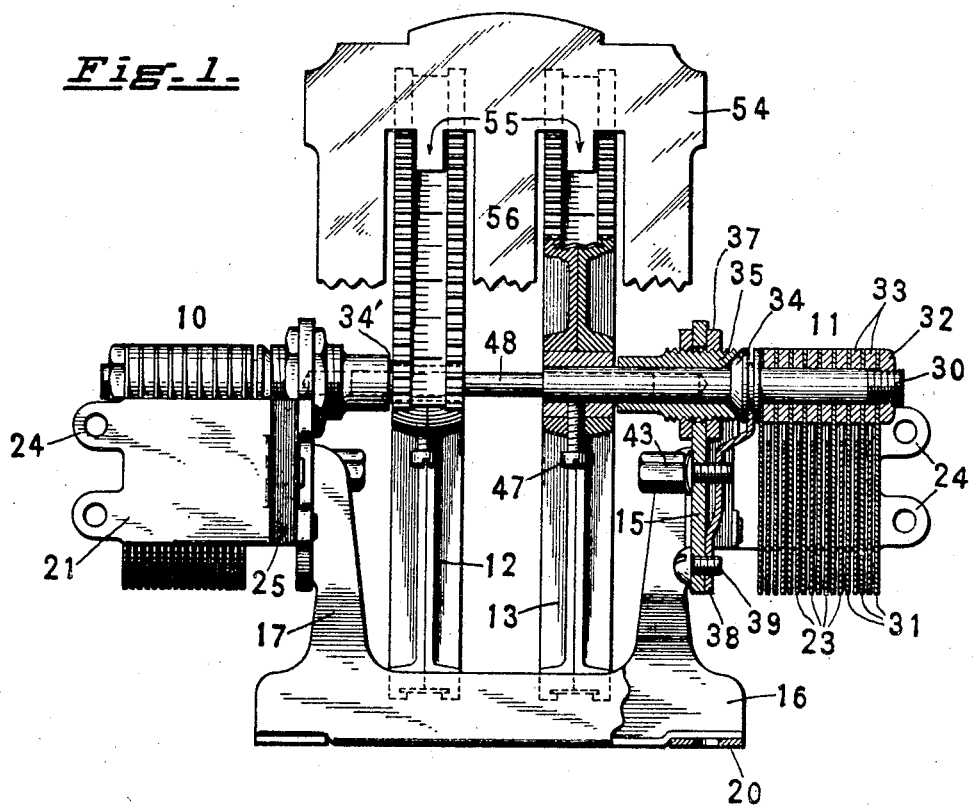
Fig. 1 is a front view of a two unit condenser with parts in vertical section.
Figure 2:
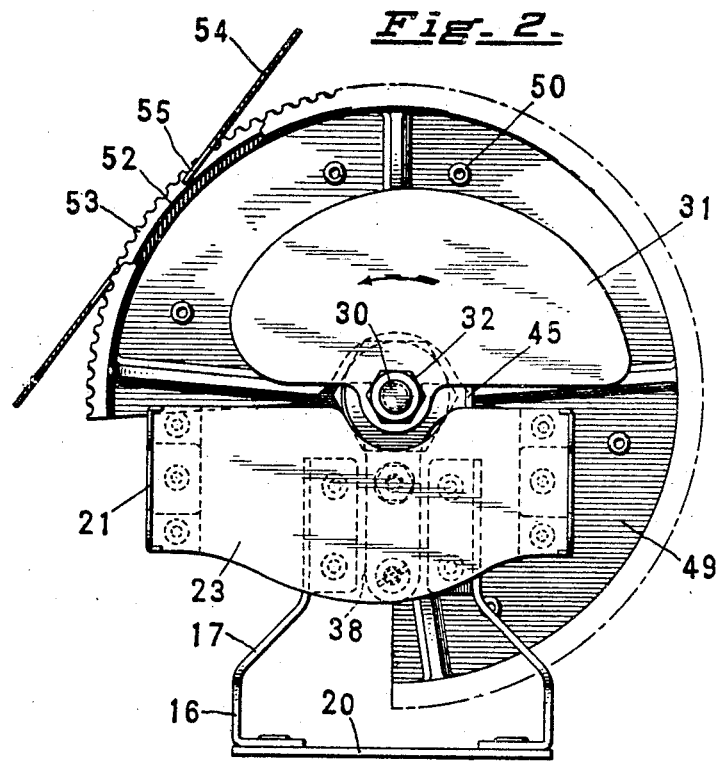
Fig. 2 is an end view of the condenser with the rotor in the disengaged position.
Figure 3:
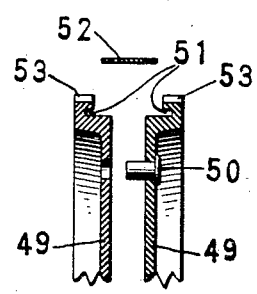
Fig. 3 is a detail view of fragments of one of the controllers.

The condenser units 10 and 11 have the operating drums or controller discs 12 and 13, respectively.

Each unit has an end plate 15 which supports the stator and rotor members and constitutes a part of the chassis. The chasis has angular sheet metal side plates 16 with posts 17 terminating in flanges 18 which are connected to the plates 15 by fasteners such as rivets 19. The side plates 16 are connected by cross pieces 20 as well as by the plates 15 so as to form a light but rigid framework.

Each stator consists of side plates 21 with slotted flanges 22 in which are secured the stator plates 23. The lugs 24 serve as convenient means for connection to other elements. The stator is mechanically supported from the end plate 15 but insulated from it by the insulating bars 25. The ends of each bar are secured to the spaced lugs 26 by rivets 27 and its center is secured to the lug 28 by rivet 29.

Each rotor has a hub 30 and plates 31 which are held in place by a nut 32 and spaced by washers 33. This hub has a conical flange 34 rotatable in a conical seat in the tubular bearing 35. The bearing is held in place in the opening 36 in the end plate 15 by adjustable nuts 37. By this means the bearing may be adjusted longitudinally in a direction at right angles to the end plate 15 so as to compensate for any wear and thus keep the rotor in its proper relation to the stator. The rotor and stator plates may be shaped to afford any desired tuning characteristics.

The rotor flange 34 is held frictionally against its seat by the clamp or brake 38, one end of which is secured to the plate 15 by the screw 39 in the seat 40 and the other end has an arcuate flange 41 which extends into the groove 42 in the flange 34. By tightening the screw 43 in the seat 44 the clamp may be drawn up so as to frictionally hold the rotor to its seat in the bearing 35. The spring washer 45 prevents the screw 43 from working loose. The lug 46 serves as a stop for the rotor to limit its rotation.

Each of the drums or discs 12 and 13 is mounted on the end of a hub 30 of the adjacent condenser being held in place by a set screw 47 or otherwise for controlling the movement of the rotors. A shaft 48 may extend loosely into the opposite hubs 30 and 34' so as to assist in holding the parts in alignment but without substantial friction.

Each controller or drum is preferably made up of two parts 49—49 held together by rivets 50 and with a channel 51 in the periphery for the scale strip 52 which is preferably movable so that it can be adjusted or replaced when desired. Obviously the strip can be marked in any desired manner as for instance in wavelength or kilocycles or calibrated or logged for certain stations. The edges of the discs are preferably knurled as at 53 to facilitate engagement and movement. A face plate or escutheon 54 is preferably provided with pointers or fingers 55 to facilitate bringing the desired scale marks on the drums into alignment.

In the form of tuner shown in Fig. 1 there are only two condensers 10 and 11 with their controllers 12 and 13 which are spaced apart. The face plate has a space bar 56 between the controller drums.

In this arrangement it will be obvious that the two controllers 12 and 13 may be operated together by the fingers of one hand or entirely independently of each other. Such a device has the advantage of simplicity and ease of control and in addition it has the important advantage of fineness of tuning with all the gradations and variations possible with the usual independent condensers and without their great difficulty of adjustment. This is particularly important now in view of the crowding of the wave bands and the overlapping of many stations which condition is getting rapidly worse.

A further advantage of the drum type controllers embodied in my invention is the entire absence of the detuning effects of the hand while operating the controller, this effect being noticeable more particularly at the higher frequencies, and is commonly termed "body capacity". While in a great many circuits the rotors of the tuning condensers will be grounded, there are many well known and useful circuits, notably among the balanced type in which neither terminal of the tuning condenser is at ground potential. When the ordinary type of knob, which is usually provided with a brass bushing and a set screw is used, the fingers in tuning more or less completely surround the condenser shaft changing its capacity to earth and thereby changing the constants of the associated circuit. With my construction the fingers engage the periphery of the insulating drums 12 and 13 and never closely approach the shaft, thus having little or substantially no effect on the circuit.

It should be understood that other arrangements and changes may be made within the scope of my invention.

I claim:

1. An actuator for a tuning element comprising a rotor shaft, a drum on said shaft formed of two discs of insulating material secured together, said drum having undercut grooves at its periphery with an indicating scale in said groove, said drum having at least one knurled rim adjacent said scale.

2. A drum comprising two disc-like members riveted together and a scale strip secured between said members.

3. A drum actuator comprising two rotatable members secured together and a scale strip secured thereon and adjustable circumferentially thereof.

4. A drum actuator comprising two members having peripheral flanges and a scale strip secured between said flanges.

5. A drum actuator comprising two members secured together, at least one of said members having a groove in one edge adjacent the other member and a scale strip mounted in said groove.

6. A drum actuator comprising two members having knurled peripheries and a scale strip secured between said knurled peripheries.

MILTON ALDEN.